US012732926B2

(12) United States Patent
Hasanzadezonuzy et al.

(10) Patent No.: US 12,732,926 B2
(45) Date of Patent: Sep. 8, 2026

(54) COMMUNICATIONS BASED ON ENERGY COSTS

(71) Applicant: QUALCOMM Incorporated, San Diego, CA (US)

(72) Inventors: Aria Hasanzadezonuzy, Jersey City, NJ (US); Navid Abedini, Basking Ridge, NJ (US); Naeem Akl, Bridgewater, NJ (US); Tommy Azzino, New York, NY (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 18/525,069

(22) Filed: Nov. 30, 2023

(65) Prior Publication Data

US 2025/0184924 A1 Jun. 5, 2025

(51) Int. Cl.
*H04W 52/42* (2009.01)
*H04B 7/06* (2006.01)
*H04W 52/30* (2009.01)

(52) U.S. Cl.
CPC .......... *H04W 52/42* (2013.01); *H04B 7/0617* (2013.01); *H04W 52/30* (2013.01)

(58) Field of Classification Search
CPC . H04W 52/42; H04W 52/30; H04W 52/0235; H04W 52/0245; H04W 24/02; H04B 7/0617; H04B 7/0695
USPC .......................................................... 455/522
See application file for complete search history.

(56) References Cited

U.S. PATENT DOCUMENTS 9,872,253 B2 1/2018 Liu et al.
2022/0131676 A1* 4/2022 Zhang .................. H04L 5/0048

FOREIGN PATENT DOCUMENTS

WO 2023159434 A1 8/2023
WO 2023170613 A1 9/2023

OTHER PUBLICATIONS

International Search Report and Written Opinion—PCT/US2024/051534—ISA/EPO—Jan. 9, 2025.

* cited by examiner

*Primary Examiner* — Eugene Yun
(74) *Attorney, Agent, or Firm* — Harrity & Harrity, LLP

(57) ABSTRACT

Various aspects of the present disclosure generally relate to wireless communication. In some aspects, a user equipment (UE) may receive signaling indicating a plurality of energy values associated with communications with a network node, wherein each energy value of the plurality of energy values is associated with a different configuration from a plurality of configurations for the communications with the network node. The UE may communicate with the network node according to a first configuration of the plurality of configurations that is associated with a first energy value of the plurality of energy values. Numerous other aspects are described.

30 Claims, 9 Drawing Sheets

400
UE
120
Network Node
110
Set of Energy Values
405
Indication of a Condition
410
Calculate Energy Efficiency
415
Communications
420

COMMUNICATIONS BASED ON ENERGY COSTS

FIELD OF THE DISCLOSURE

Aspects of the present disclosure generally relate to wireless communication and specifically relate to techniques, apparatuses, and methods for communications based on energy costs.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes receiving signaling indicating a plurality of energy values associated with communications with a network node, wherein each energy value of the plurality of energy values is associated with a different configuration from a plurality of configurations for the communications with the network node; and communicating with the network node according to a first configuration of the plurality of configurations that is associated with a first energy value of the plurality of energy values.

In some aspects, a method of wireless communication performed by a network node includes transmitting, to a UE, signaling indicating a plurality of energy values associated with communications with the network node, wherein each energy value of the plurality of energy values is associated with a different configuration from a plurality of configurations for the communications with the network node; and communicating with the UE according to a first configuration of the plurality of configurations that is associated with a first energy value of the plurality of energy values.

In some aspects, an apparatus for wireless communication at a UE includes one or more memories; and one or more processors, coupled to the one or more memories, the one or more processors individually or collectively configured to: receive signaling indicating a plurality of energy values associated with communications with a network node, wherein each energy value of the plurality of energy values is associated with a different configuration from a plurality of configurations for the communications with the network node; and communicate with the network node according to a first configuration of the plurality of configurations that is associated with a first energy value of the plurality of energy values.

In some aspects, an apparatus for wireless communication at a network node includes one or more memories; and one or more processors, coupled to the one or more memories, the one or more processors individually or collectively configured to: transmit, to a UE, signaling indicating a plurality of energy values associated with communications with the network node, wherein each energy value of the plurality of energy values is associated with a different configuration from a plurality of configurations for the communications with the network node; and communicate with the UE according to a first configuration of the plurality of configurations that is associated with a first energy value of the plurality of energy values.

In some aspects, a non-transitory computer-readable medium storing a set of instructions for wireless communication includes one or more instructions that, when executed by one or more processors of a UE, cause the UE to: receive signaling indicating a plurality of energy values associated with communications with a network node, wherein each energy value of the plurality of energy values is associated with a different configuration from a plurality of configurations for the communications with the network node; and communicate with the network node according to a first configuration of the plurality of configurations that is associated with a first energy value of the plurality of energy values.

In some aspects, a non-transitory computer-readable medium storing a set of instructions for wireless communication includes one or more instructions that, when executed by one or more processors of a network node, cause the network node to: transmit, to a UE, signaling indicating a plurality of energy values associated with communications with the network node, wherein each energy value of the plurality of energy values is associated with a different configuration from a plurality of configurations for the communications with the network node; and communicate with the UE according to a first configuration of the plurality of configurations that is associated with a first energy value of the plurality of energy values.

In some aspects, an apparatus for wireless communication includes means for receiving signaling indicating a plurality of energy values associated with communications with a network node, wherein each energy value of the plurality of energy values is associated with a different configuration from a plurality of configurations for the communications with the network node; and means for communicating with the network node according to a first configuration of the plurality of configurations that is associated with a first energy value of the plurality of energy values.

In some aspects, an apparatus for wireless communication includes means for transmitting, to a UE, signaling indicating a plurality of energy values associated with communications with the network node, wherein each energy value of the plurality of energy values is associated with a different configuration from a plurality of configurations for the communications with the network node; and means for communicating with the UE according to a first configuration of the plurality of configurations that is associated with a first energy value of the plurality of energy values.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
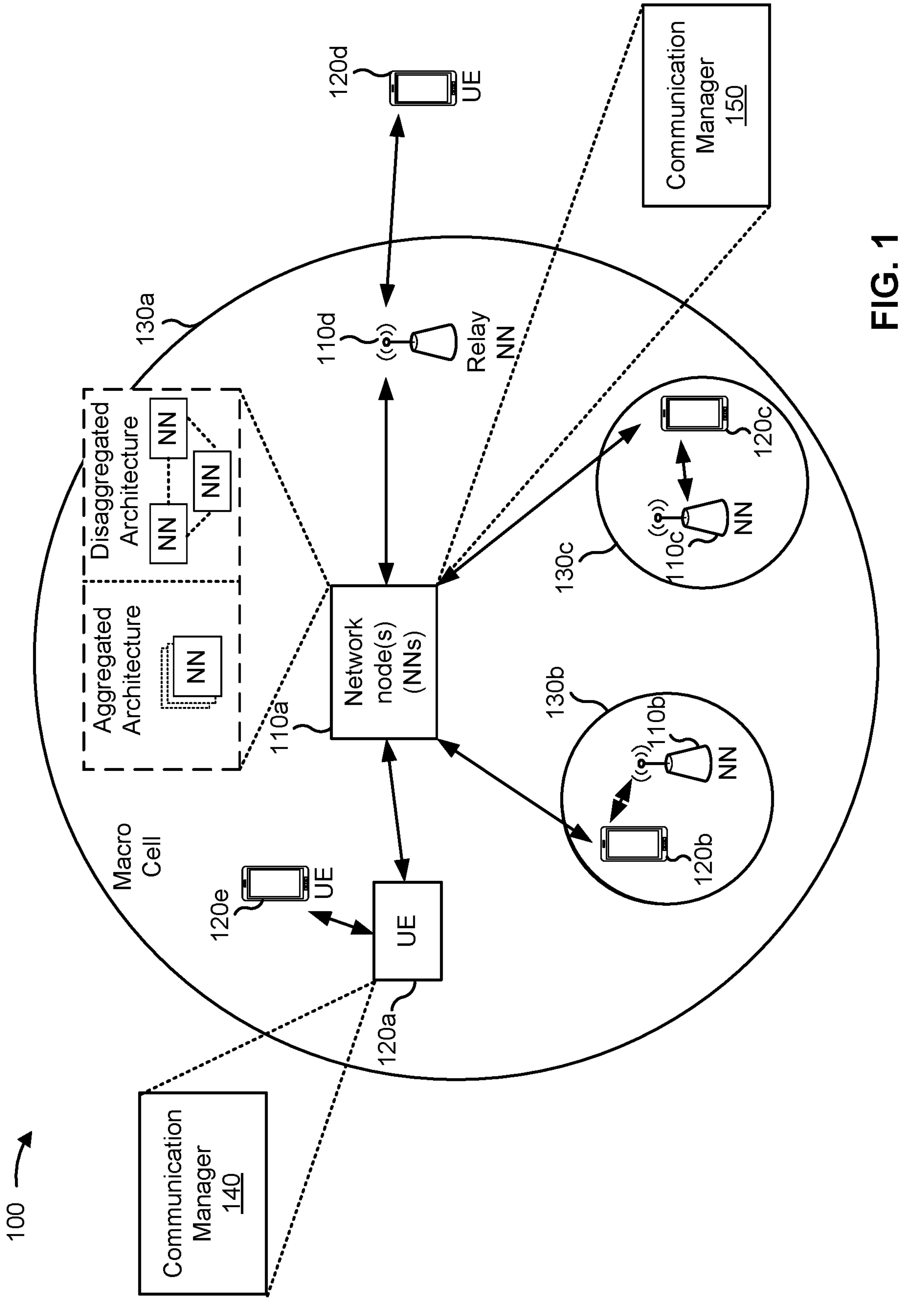
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In wireless communication networks, communications between devices (e.g., between network nodes, between a network node and a user equipment (UE), between UEs) may be associated with an energy cost at each device. The energy cost may be based on a burden placed on a device to communicate with another device (e.g., an amount of time, frequency, energy, and/or power resources used by the device to communicate with the other device). For example, the energy cost may be based on one or more of an amount of energy consumed by the device when communicating with the other device, an amount of power used by the device to communicate with the other device, a load introduced to a cell based on the communications between the device and the other device, or a latency associated with communications between the devices. In some wireless communication networks, a first device may indicate (e.g., to a second device) a single energy cost associated with communications between the first device and the second device. For example, the first device may transmit, to the second device, a single energy value that is indicative of an energy cost associated with the communications between the first and second devices.

However, the energy cost at the first device may not be constant. That is, the energy cost at the first device may change in response to the first device using different configurations for communicating with the second device. For example, the first device may consume a first amount of energy when communicating with the second device using a first serving beam, and may consume a second, different amount of energy when communicating with the second device using a second, different serving beam. In another example, the first device may consume a first amount of energy when communicating with the second device using a first quantity of antenna elements, and may consume a second, different amount of energy when communicating with the second device using a second, different quantity of antenna elements. In another example, the first device may consume more energy when communicating with the second device via a wireless communications link that is associated with a first, higher signal quality, as compared to when communicating with the second device via a wireless communications link that is associated with a second, lower signal quality.

Because the energy cost at the first device is dependent on configurations that may change, the first device indicating a single energy cost may not effectively indicate the energy cost (which may be different in response to different configurations) of communicating with the second device.

Various aspects relate generally to a first device (e.g., a UE, a network node) indicating multiple energy values that are each associated with a different configuration for communications with the first device. That is, each energy value may indicate an energy cost at the first device that corresponds to one configuration from a set of configurations for communications with the first device. In some cases, the first device may additionally indicate a condition that is associated with the set of energy values. For example, the first device may indicate a condition for a conditional handover, for a conditional lower layer triggered mobility (LTM), for a cell selection or reselection procedure, for reporting measurements, and/or for performing measurements. In a case where the first device indicates the condition, the condition may be satisfied based, at least in part, on whether an energy value associated with the configuration satisfies a threshold energy value associated with the condition.

Particular aspects of the subject matter described in this disclosure can be implemented to realize one or more of the following potential advantages. In some examples, by indicating a set of energy values that are each associated with a different configuration, the described techniques can be used to accurately indicate an energy cost associated with communications with the first device, even in cases where the first device changes a configuration for the communications. This may increase a coordination between devices as compared to a wireless communication network where the first device indicates a single energy value. Additionally, by indicating the condition associated with the set of energy values, the first and second devices may perform procedures and/or communications that decrease the cost (e.g., the time cost, the frequency resources cost, the energy cost, the power cost) for the communications at the first device. For example, the cost may be decreased as compared to a devices that do not perform the procedures and/or communications in accordance with conditions that are based, at least in part, on the energy values. Such a decrease in cost may decrease power consumption at the first device and/or decrease latency associated with communications between the first and second devices.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a “Sub-6 GHz” band in some documents and articles. Similarly, FR2 is often referred to (interchangeably) as a “millimeter wave” band in some documents and articles, despite being different than the extremely high frequency (EHF) band (30 GHz through 300 GHz), which is identified by the International Telecommunications Union (ITU) as a “millimeter wave” band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, “sub-6 GHz,” if used herein, may broadly refer to frequencies that are less than 6 GHz, that are within FR1, and/or that are included in mid-band frequencies. Similarly, the term “millimeter wave,” if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term “cell” can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 monitors), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive signaling indicating a plurality of energy values associated with communications with a network node, wherein each energy value of the plurality of energy values is associated with a different configuration from a plurality of configurations for the communications with the network node; and communicate with the network node according to a first configuration of the plurality of configurations that is associated with a first energy value of the plurality of energy values. Additionally, or alternatively, the communication manager 140 may perform one or more other operations described herein.

In some aspects, the network node 110 may include a communication manager 150. As described in more detail elsewhere herein, the communication manager 150 may transmit, to a UE, signaling indicating a plurality of energy values associated with communications with the network node, wherein each energy value of the plurality of energy values is associated with a different configuration from a plurality of configurations for the communications with the network node; and communicate with the UE according to a first configuration of the plurality of configurations that is associated with a first energy value of the plurality of energy values. Additionally, or alternatively, the communication manager 150 may perform one or more other operations described herein.

As indicated above, FIG. 1 is provided as an example. Other examples may differ from what is described with regard to FIG. 1.

Figure 2:
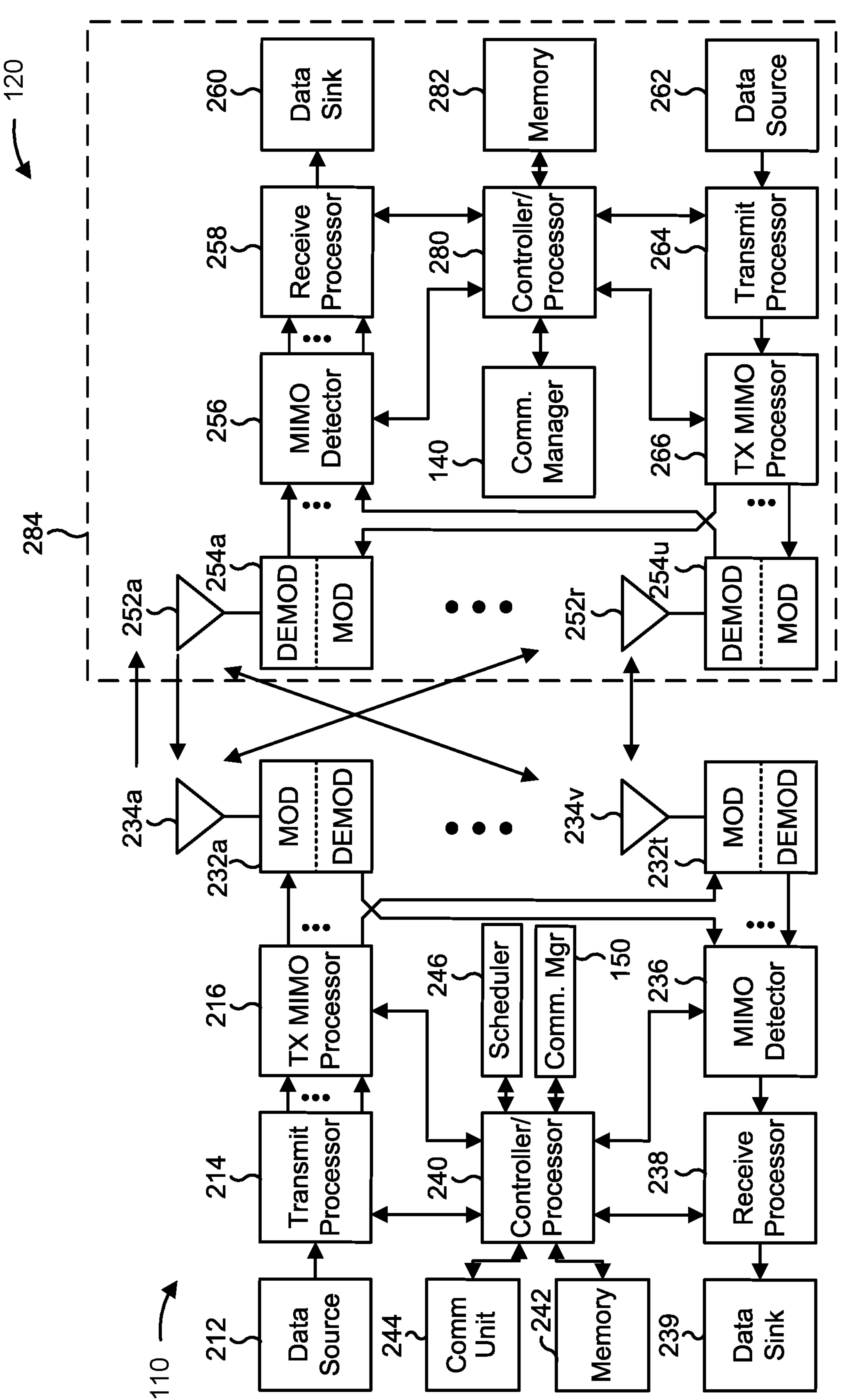
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, the UE includes means for receiving signaling indicating a plurality of energy values associated with communications with a network node, wherein each energy value of the plurality of energy values is associated with a different configuration from a plurality of configurations for the communications with the network node; and/or means for communicating with the network node according to a first configuration of the plurality of configurations that is associated with a first energy value of the plurality of energy values. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, signaling indicating a plurality of energy values associated with communications with the network node, wherein each energy value of the plurality of energy values is associated with a different configuration from a plurality of configurations for the communications with the network node; and/or means for communicating with the UE according to a first configuration of the plurality of configurations that is associated with a first energy value of the plurality of energy values. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
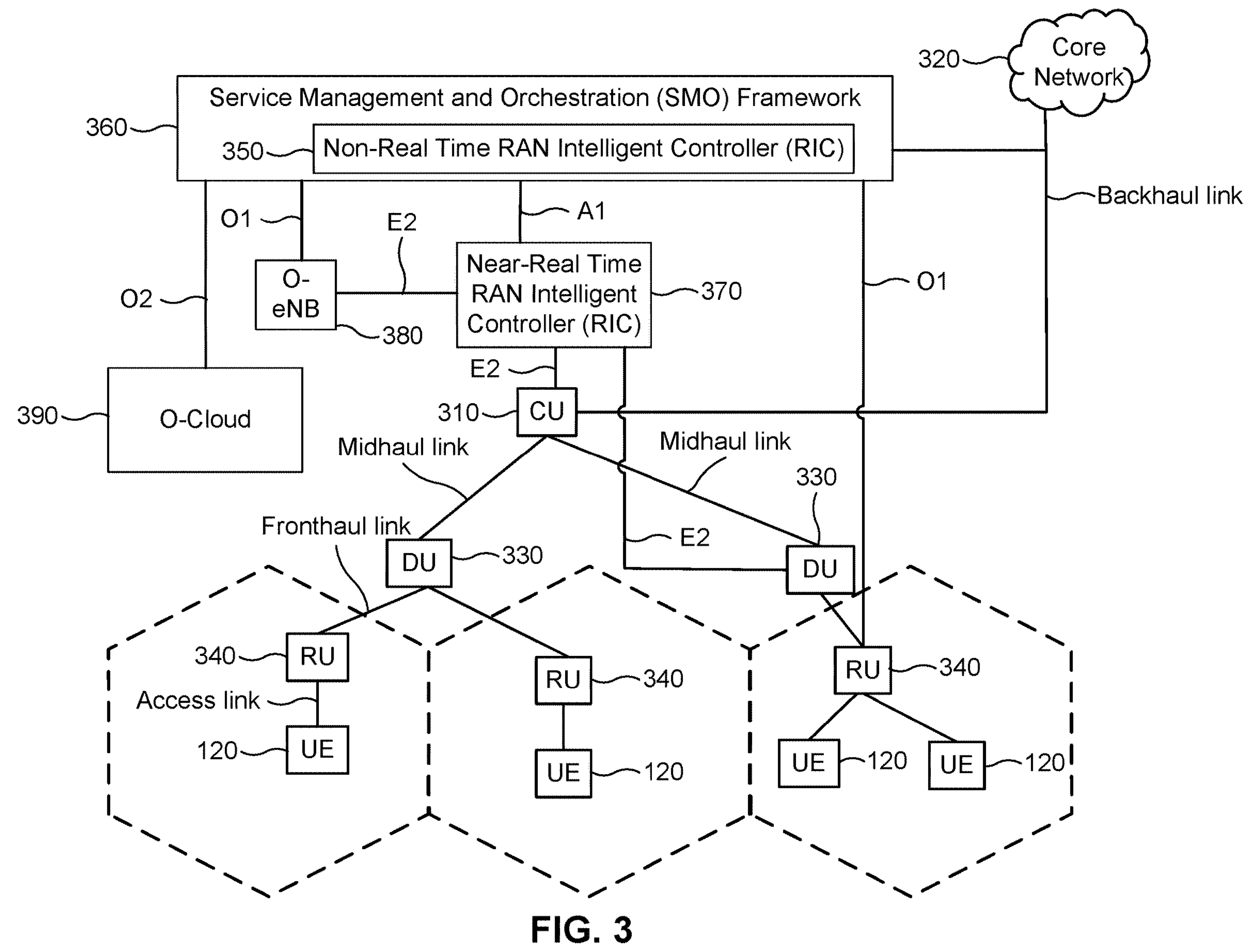
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with communications based on energy costs, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 600 of FIG. 6, process 700 of FIG. 7, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 600 of FIG. 6, process 700 of FIG. 7, or other processes as described herein. In some examples, executing instructions may include running the instructions, converting the instructions, compiling the instructions, and/or interpreting the instructions, among other examples.

Figure 4:
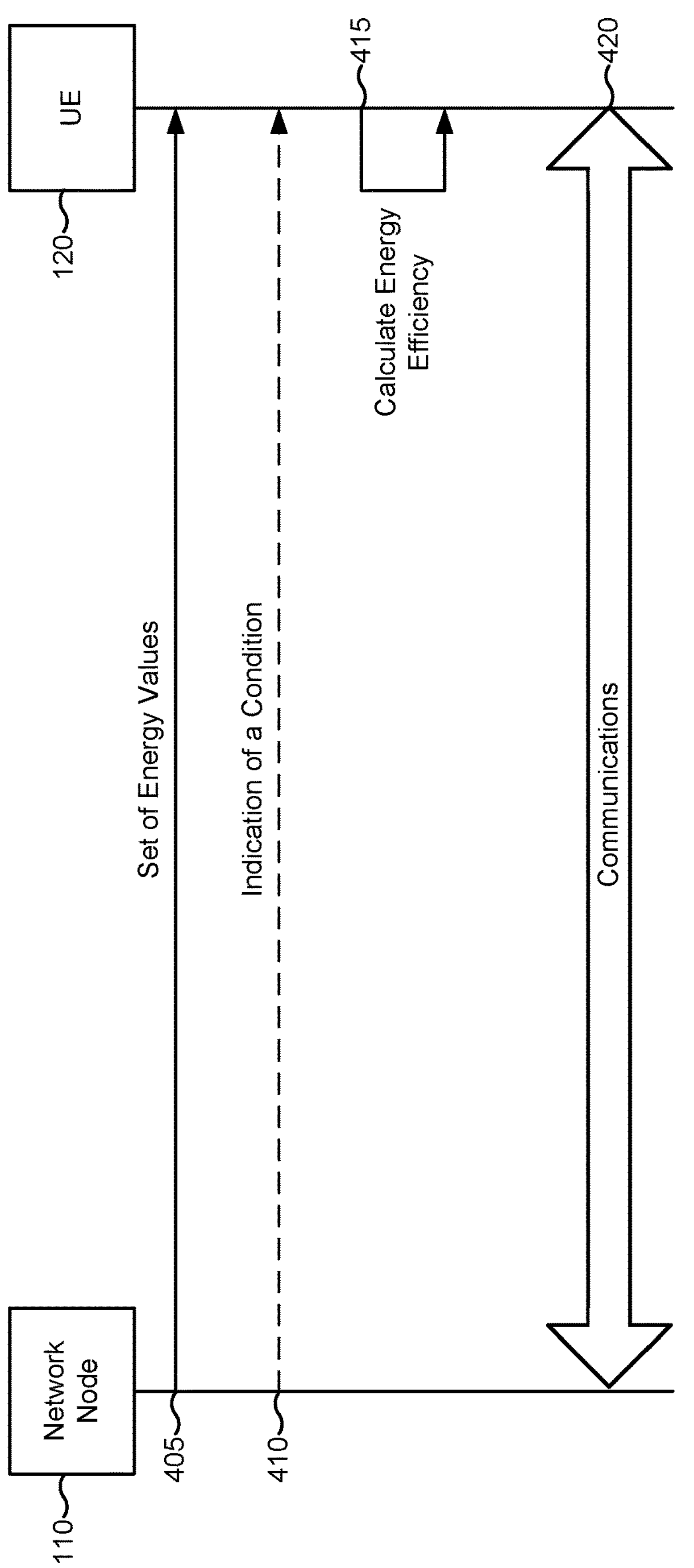
FIGS. 4 and 5 are diagrams illustrating examples associated with communications based on energy costs, in accordance with the present disclosure.

FIG. 4 is a diagram illustrating an example 400 associated with communications based on energy costs, in accordance with the present disclosure. As shown in FIG. 4, a network node 110 and a UE 120 may communicate with one another. While FIG. 4 illustrates communications between the network node 110 and the UE 120, the communications illustrated by example 400 may also be exchanged between two network nodes 110 (e.g., via a backhaul link) or between two UEs 120 (e.g., via a sidelink).

As shown by reference number 405, the network node 110 may transmit, and the UE 120 may receive, signaling indicating a set of energy values. For example, the network node 110 may transmit the signaling via a multicast signal or broadcast signal (e.g., via a system information block) or via a dedicated signal (e.g., via RRC signaling, via a MAC-CE, via DCI). In some cases, each energy value may be associated with a different configuration from a set of configurations for communications with the network node 110. That is, each energy value may be dependent on other parameters (e.g., that correspond to the configuration that is associated with the energy value).

The energy values may indicate an energy cost at the network node 110 corresponding to one of the set of configurations. In some cases, the cost may be defined (e.g., as an abstract value) to represent a burden (e.g., an extra burden) of serving the UE 120. For example, the burden may be associated with an extra induced load on a cell of the network node 110, an extra power consumption at the network node 110, an extra energy consumption at the network node 110, an extra resource usage of resources (e.g., time or frequency resources) of the network node 110, or another type of burden associated with serving the UE 120. The energy values may be an index, where each possible value of the index corresponds to a range of energy costs at the network node 110. Additionally, or alternatively, the energy values may be quantized values indicative of a range of energy costs at the network node.

In one example, the configurations (e.g., that are associated with energy values) may include serving beam configurations associated with a set of serving beams of the network node. In this example, each energy value may be associated with a different serving beam configuration from the set of serving beam configurations. For instance, each energy value may be associated with different synchronization signal block (SSB) indices or different groups of SSBs. In some cases, different serving beam configurations may incur different costs (e.g., a cost may be beam-specific). A serving beam configuration may be associated with one or more serving beams or serving beam configurations at the network node 110, one or more arrays or array configurations at the network node 110, one or more TRPs or TRP configurations at the network node 110, or one or more active antenna elements or antenna element configurations at the network node 110.

In one instance, some serving beams may be used for communications to the UE 120 that are communicated to the UE 120 via an assisting device (e.g., a repeater, a reconfigurable intelligent surface (RIS)). In this instance, the network node 110 may incur higher costs e.g., higher energy costs, higher power consumption, and/or higher signaling overhead) when communicating via the serving beams associated with an assisting device as compared to communicating via serving beams that are not associated with an assisting device. In another instance, some serving beams may be more loaded (e.g., there may be more communications transmitted or received via some serving beams as compared to others). In this instance, the network node 110 may incur higher costs (e.g., higher energy costs, higher power consumption, increased latency) when communicating via serving beams that are more loaded as compared to communicating via serving beams that are not as loaded. In another instance, some serving beam configurations may be associated with different arrays or TRPs at the network node 110 that are configured differently, and accordingly incur different costs during communications via those serving beam configurations. In another instance, some different serving beam configurations may be associated with different quantities of active antenna elements. In this instance, the network node 110 may incur higher costs (e.g., higher energy costs, higher power consumption) when communicating via serving beam configurations that are associated with more active antenna elements as compared to communicating via serving beam configurations that are associated with less active antenna elements.

Because the different serving beam configurations may be associated with different costs (e.g., different energy costs, different power consumptions, different latencies, different amounts of signaling overhead), the network node 110 may indicate different energy values for the different serving beam configurations.

In another example, the configurations may include different configurations that are each associated with different signal quality thresholds for communications with the network node 110. Additionally, or alternatively, different configurations may include different target signal qualities (e.g., signal qualities that are greater than or equal to the signal quality thresholds) for communications with the network node 110. In this example, each energy value may be associated with a different signal quality threshold. In this instance, different configurations may be associated with different signal-to-noise ratio (SNR) thresholds, different RSRP thresholds, different SSB RSRPs, or other signal quality metric thresholds. In some cases, the different signal quality thresholds may correspond to different link budgets. In some cases, the network node 110 may incur higher costs (e.g., higher energy costs, high power consumption) when communicating according to a configuration that is associated with a higher signal quality threshold as compared to communicating according to a configuration that is associated with a lower signal quality threshold. Because the different configurations associated with different signal quality thresholds may be associated with different costs (e.g., different energy costs, different power consumptions), the network node 110 may indicate different energy values for each of the different configurations associated with different signal quality thresholds.

In another example, the configurations may include different configurations of a cell associated with the network node 110. In some cases, the configurations of the cell may correspond to a transmission power, a quantity of antennas used for communications, a transmission and/or reception repetition factor, a bandwidth allocated for the communications, and/or other transmission/reception processing such as digital pre-distortion processing and digital post-distortion processing. In this example, the various configurations (and the different combinations of parameters associated with those configurations) may each be associated with different costs (e.g., different energy costs, power consumptions, time and frequency resource usages). Accordingly, the network node 110 may indicate different energy values for each of the different configurations of the cell.

As shown by reference number 410, the network node 110 may transmit, and the UE 120 may receive, an indication of a condition that is associated with the set of energy values. For example, the network node 110 may transmit the indication of the condition via RRC messaging. In some instances, the UE 120 may perform procedures or communications in response to whether the condition is satisfied. For example, the condition may include one or more rules associated with how to use the set of energy values. Here, the condition may indicate, to the UE, one or more rules associated with how to use the set of energy values to determine whether to execute a conditional handover or a conditional LTM, whether to perform a cell selection or reselection procedure, whether to perform one or more cell measurements, or whether to report one or more cell measurements.

In one example, the condition may be for a conditional handover. In some cases, the network node 110 may indicate for the UE 120 to perform a conditional handover in cases where a candidate destination network node 110 supports communications with the UE 120 that are associated with an energy value that is less than a threshold energy value. Additionally, or alternatively, the network node 110 may indicate for the UE 120 to perform the conditional handover in cases where the source network node 110 is unable to support communications with the UE 120 that are associated with an energy value that is less than a threshold energy value.

In another example, the condition may be for a conditional LTM. In some cases, the network node 110 may indicate for the UE 120 to perform a conditional LTM in cases where a candidate cell supports communications with the UE 120 that are associated with an energy value that is less than a threshold energy value. Additionally, or alternatively, the network node 110 may indicate for the UE 120 to perform the conditional LTM in cases where a source cell is unable to support communications with the UE 120 that are associated with an energy value that is less than a threshold energy value.

In another example, the condition may be for a cell selection or reselection procedure. In some cases, the network node 110 may indicate for the UE 120 to perform a cell or reselection selection procedure (e.g., to establish a communications link with the cell) in cases where a cell supports communications with the UE 120 that are associated with an energy value that is less than a threshold energy value.

In another example, the condition may be for performing measurements or reporting measurements associated with the set of configurations. In some cases, the network node 110 may indicate for the UE 120 to perform measurements or report measurements for cells (e.g., that are associated with the network node 110 or associated with another network node 110) if the cell supports communications with the UE 120 that are associated with an energy value that is less than a threshold energy value.

In some cases, the condition may additionally be associated with one or more additional parameters. For example, the condition may be based on a combination of the set of energy values and one or more other parameters, such as one or more of a signal quality metric, an identifier associated with a network node 110 or cell associated with a network node 110, or a parameter otherwise associated with communications between the UE 120 and a network node 110. For example, parameters associated with the signal quality metrics may include one or more of an RSRP, an RSRQ, an SNR, or a signal-to-noise-plus-interference ratio (SINR). Additionally, parameters associated with an identifier may include a beam identifier (e.g., that identifies a beam supported by a network node 110 and/or cell), a cell identifier (e.g., that identifies a cell supported by a network node 110), a position identifier (e.g., that identifies a position of the UE 120), and/or a zone identifier (e.g., e.g., that identifies a zone within a cell supported by a network node 110). Additionally, parameters that are otherwise associated with the communications between the UE 120 and the network node 110 may include a quality of service (QoS) type (e.g., Voice over internet protocol (VoIP), video on demand (VOD), internet protocol television (IPTV), etc.) and a time of day (e.g., during which the communications between the UE 120 and the network node 110 are occurring).

In one example, the condition may be based on a combination of the set of energy values and a signal quality metric. Here, the condition may be an energy efficiency metric, which corresponds to a rate divided by a power consumption. In this example, the UE 120 may calculate the rate based on the measured signal quality, and the UE 120 may identify the power consumption using the set of energy values.

In cases where the condition is additionally associated with the one or more additional parameters, the UE 120 may determine a decision value that is based on the combination of set of energy values and the one or more additional parameters. Here, the UE 120 may determine that the condition is satisfied when the decision value satisfies a threshold. For example, the decision value may be a function of one of the energy values in the set and the additional parameters. In some cases, a network node 110 (e.g., the network node 110 illustrated in FIG. 4 or another network node 110) may transmit signaling indicating the function that maps the combination of the energy value and the additional parameters to a decision value. Additionally, or alternatively, the function that maps the combination of the energy value and the additional parameters to the decision value may be preconfigured (e.g., by another network node 110) or predefined (e.g., by a telecommunication standard).

As shown by reference number 415, the UE 120 may calculate an energy efficiency for communications with the network node 110. For example, the UE 120 may identify an energy cost, or range of energy costs, that are identified by an energy value. Based on the identified energy cost, the UE 120 may calculate an energy efficiency for communications with the network node 110 according to the configuration that is associated with the energy value. In some cases, calculating the energy efficiency may enable the UE 120 to identify energy efficiencies for communication with the network node 110 via each of the set of configurations.

As shown by reference number 420, the UE 120 may communicate with the network node 110. For example, the UE 120 may communicate with the network node 110 according to a first configuration (e.g., from the set of configurations) that is associated with a first energy value (e.g., from the set of energy values).

In cases where the network node 110 provides, to the UE 120, the indication of the condition associated with the set of energy values, the UE 120 may perform communications in response to whether the condition associated with the set of energy values (and, in some cases, additionally associated with one or more additional parameters) is satisfied. For example, the UE 120 may execute a conditional handover (e.g., from the network node 110 or to the network node 110) or a conditional LTM, may perform a cell selection or reselection procedure with the network node 110, may perform one or more cell measurements (e.g., associated with communications from the network node 110), or may report one or more cell measurements to the network node 110.

In some cases, the network node 110 may communicate signaling indicating an update to one or more energy values of the set of energy values. For example, the network node 110 may transmit, to the UE 120, signaling indicating an update to one or more of the energy values of the set of energy values. To update (e.g., modify) the one or more energy values, the network node 110 may transmit the signaling to the UE 120 via a MAC-CE, a PDCCH, or an RRC reconfiguration. In some cases, the network node 110 may transmit the signaling via the MAC-CE or the PDCCH indicating the updated values based, at least in part, on the UE 120 being connected (e.g., being associated with a connected-mode radio resource management).

As indicated above, FIG. 4 is provided as an example. Other examples may differ from what is described with respect to FIG. 4.

Figure 5:
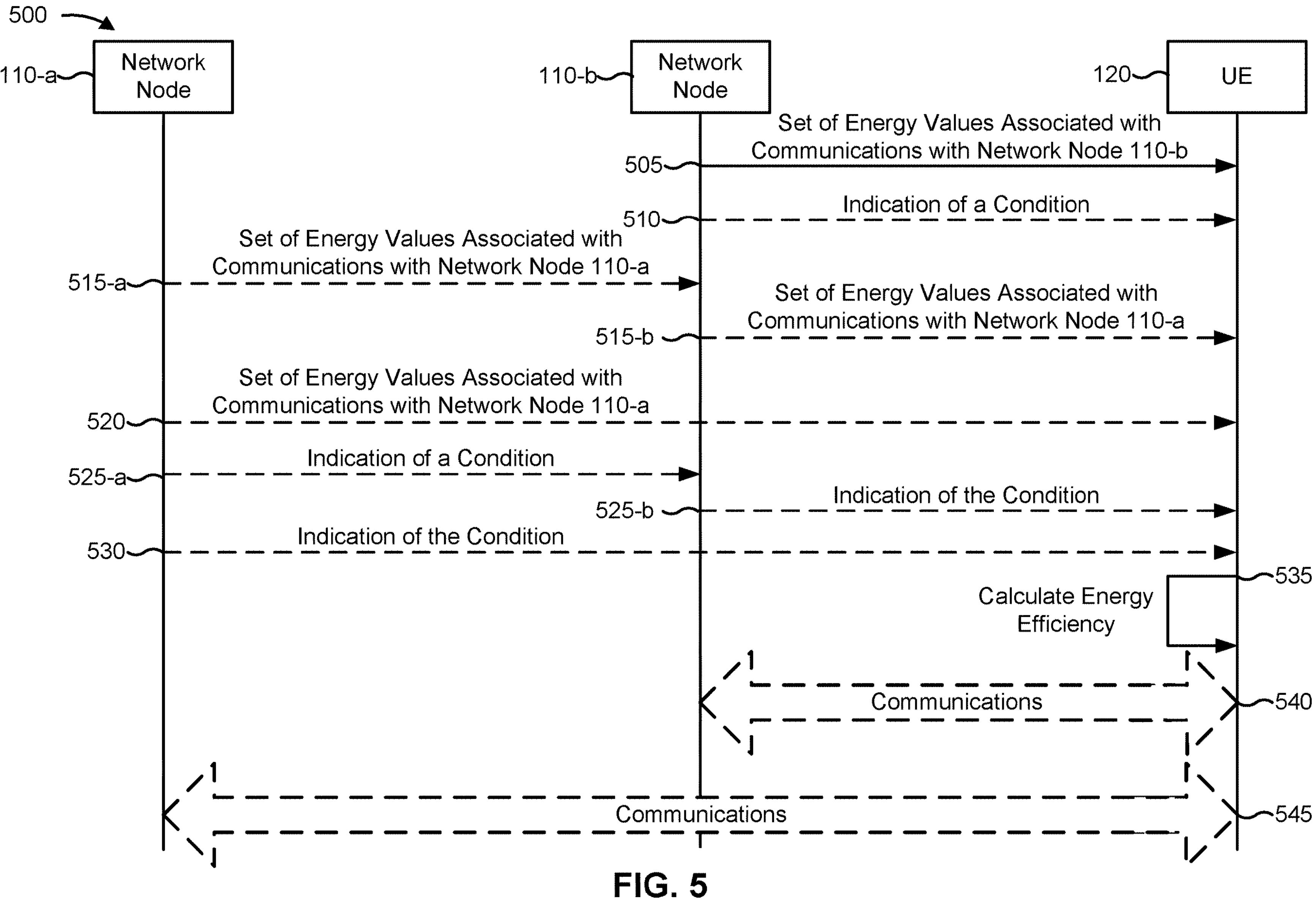

FIG. 5 is a diagram illustrating an example 500 associated with communications based on energy costs, in accordance with the present disclosure. As shown in FIG. 5, a network node 110 and a UE 120 may communicate with one another. While FIG. 4 illustrates communications between a UE 120 and a single network node 110, FIG. 5 illustrates communications between a UE 120, a first network node 110-*a*, and a second network node 110-*b*.

In some cases, the features illustrated in FIG. 5 may be examples of the features illustrated in FIGS. 1 through 4. For example, the signaling and the set of energy values illustrated by reference numbers 505, 515, and 520 may be examples of the signaling and energy values illustrated by reference number 405 in FIG. 4. Additionally, the signaling and the condition illustrated by reference numbers 510, 525, and 530 may be examples of the signaling and conditions illustrated by reference number 410 in FIG. 4. Additionally, the calculation illustrated by reference number 535 and the communications illustrated by reference numbers 540 and 545 may be examples of the calculation illustrated by reference number 415 and the communications illustrated by 420 in FIG. 4, respectively.

As shown by reference number 505, the network node 110-*b* may transmit, and the UE 120 may receive, signaling indicating a first set of energy values, where each energy value of the first set of energy values is associated with a different configuration (e.g., from a set of configurations) for communications with the network node 110-*b*.

As shown by reference number 510, the network node 110-*b* may transmit, and the UE 120 may receive, an indication of a first condition that is associated with the first set of energy values.

As shown by reference numbers 515-*a* and 515-*b*, the network node 110-*b* may transmit, and the UE 120 may receive, signaling indicating a second set of energy values associated with communications between the UE 120 and another network node 110-*a*. That is, the network nodes 110 may exchange sets of energy values with other network nodes 110 (e.g., over an F1 interface, over an Xn interface, over an NGAP interface). For example, the network node 110-*a* may indicate, to the network node 110-*b*, the first set of energy values associated with communications with the network node 110-*a*, and the network node 110-*b* may indicate, to the network node 110-*a*, the second set of energy values associated with communications with the network node 110-*b*.

In some cases, the network nodes 110 may exchange sets of energy values in a UE-associated manner or a non-UE-associated manner. In a case where the network nodes 110 exchange sets of energy values in the UE-associated manner, the network nodes 110 may exchange sets of energy values that are associated with communications between the network node 110 and a specific UE 120. In a case where the network nodes 110 exchange sets of energy values in the non-UE-associated manner, the network nodes 110 may exchange sets of energy values that are associated with communications at the network node (e.g., independently of a specific UE 120).

In example 500, reference number 515-*a* illustrates the network node 110-*a* providing, to the network node 110-*b*, the second set of energy values associated with communications with the network node 110-*a*. Additionally, reference number 515-*b* shows the network node 110-*b* transmitting, and the UE 120 receiving, signaling indicating the second set of energy values associated with communications with the network node 110-*a*. For example, if the UE 120 is communicating with the network node 110-*b* in a connected-mode radio resource management, a serving cell associated with the network node 110-*b* may provide the second set of energy values associated with communications with the other network node 110-*a* via RRC messaging, via a MAC-CE. Here, the UE 120 may perform a conditional handover or a conditional LTM based on the second set of energy values. In another example, if the UE 120 is idle or inactive, the network node 110-*b* may provide the second set of energy values associated with communications with the other network node 110-*a* via a system information block (e.g., that carries information about other serving cells). Here, the UE 120 may perform cell selection or reselection based on the second set of energy values.

In another example, the network node 110-*a* may provide the second set of energy values associated with communications with the network node 110-*a* directly to the UE 120. For example, reference number 520 illustrates an example where the network node 110-*a* transmits, and the UE 120 receives, signaling indicating the second set of energy values associated with communications with the network node 110-*a*.

As shown by reference numbers 525 or 530, the UE 120 may receive an indication of a second condition that is associated with the second set of energy values. In the example illustrated by reference number 525, the network node 110-*a* may transmit, to the network node 110-*b*, the indication of the second condition that is associated with the second set of energy values. Additionally, reference number 525-*b* shows the network node 110-*b* transmitting, and the UE 120 receiving, the indication of the second condition. In another example, the network node 110-*a* may indicate the second condition directly to the UE 120. For example, reference number 530 illustrates an example where the network node 110-*a* transmits, and the UE 120 receives, the indication of the second condition.

As shown by reference number 535, the UE 120 may calculate an energy efficiency for communications with each network node 110-*a* and 110-*b*. For example, the UE 120 may calculate the energy efficiency for communications with the network node 110-*a* using the second set of energy values, and may calculate the energy efficiency for communications with the network node 110-*b* using the first set of energy values.

As shown by reference numbers 540 and 545, the UE 120 may communicate with the network nodes 110-*b* and 110-*a*, respectively. In cases where the network nodes 110 provide, to the UE 120, the indication of the first and second conditions associated with the first and second sets of energy values, the UE 120 may perform communications in response to whether the condition associated with the set of energy values (and, in some cases, additionally associated with one or more additional parameters) is satisfied. For example, the UE 120 may execute a conditional handover (e.g., from the network node 110-*b* to the network node 110-*a*) or a conditional LTM (e.g., between cells of the network node 110-*b*).

Additionally, or alternatively, the UE 120 may perform a cell selection or reselection procedure with a network node 110. For example, the UE 120 may receive the first and second sets of energy values and determine to perform a cell selection procedure (e.g., an association) with the network node 110 based on the calculated energy efficiency of each network node 110-*a* and 110-*b*.

In some cases, the network node 110 may communicate signaling indicating an update to one or more energy values of the set of energy values. For example, the network node 110 may transmit, to the UE 120, signaling indicating an update to one or more of the energy values of the set of energy values. To update (e.g., modify) the one or more energy values, the network node 110 may transmit the signaling to the UE 120 via a MAC-CE, a PDCCH, or an RRC reconfiguration. In some cases, the network node 110 may transmit the signaling via the MAC-CE or the PDCCH indicating the updated values based, at least in part, on the UE 120 being connected (e.g., being associated with a connected-mode radio resource management).

As indicated above, FIG. 5 is provided as an example. Other examples may differ from what is described with respect to FIG. 5.

Figure 6:
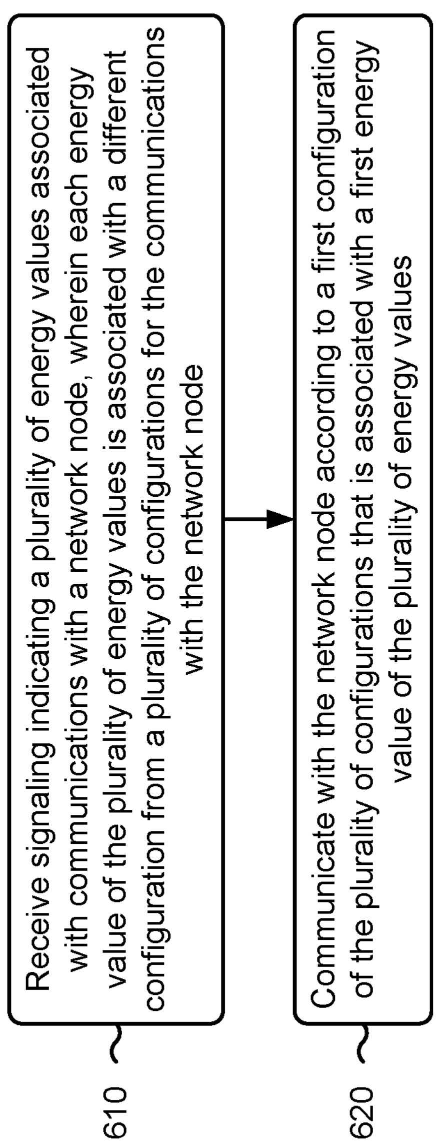
FIG. 6 is a diagram illustrating an example process performed, for example, at a UE or an apparatus of a UE, in accordance with the present disclosure.

FIG. 6 is a diagram illustrating an example process 600 performed, for example, at a UE or an apparatus of a UE, in accordance with the present disclosure. Example process 600 is an example where the apparatus or the UE (e.g., UE 120) performs operations associated with communications based on energy costs.

As shown in FIG. 6, in some aspects, process 600 may include receiving signaling indicating a plurality of energy values associated with communications with a network node, wherein each energy value of the plurality of energy values is associated with a different configuration from a plurality of configurations for the communications with the network node (block 610). For example, the UE (e.g., using reception component 802 and/or communication manager 806, depicted in FIG. 8) may receive signaling indicating a plurality of energy values associated with communications with a network node, wherein each energy value of the plurality of energy values is associated with a different configuration from a plurality of configurations for the communications with the network node, as described above.

As further shown in FIG. 6, in some aspects, process 600 may include communicating with the network node according to a first configuration of the plurality of configurations that is associated with a first energy value of the plurality of energy values (block 620). For example, the UE (e.g., using reception component 802, transmission component 804, and/or communication manager 806, depicted in FIG. 8) may communicate with the network node according to a first configuration of the plurality of configurations that is associated with a first energy value of the plurality of energy values, as described above.

Process 600 may include additional aspects, such as any single aspect or any combination of aspects described below and/or in connection with one or more other processes described elsewhere herein.

In a first aspect, each energy value, of the plurality of energy values, indicates an energy cost at the network node corresponding to one of the plurality of configurations.

In a second aspect, alone or in combination with the first aspect, each configuration from the plurality of configurations comprises a serving beam configuration from a plurality of serving beam configurations, wherein each energy value of the plurality of energy values is associated with a different serving beam configuration from the plurality of serving beam configurations.

In a third aspect, alone or in combination with one or more of the first and second aspects, the plurality of serving beam configurations comprise different SSB indices or different groups of SSBs.

In a fourth aspect, alone or in combination with one or more of the first through third aspects, each configuration from the plurality of configurations is associated with a signal quality threshold from a plurality of signal quality thresholds, wherein each energy value of the plurality of energy values is associated with a different signal quality threshold from the plurality of signal quality thresholds.

In a fifth aspect, alone or in combination with one or more of the first through fourth aspects, the plurality of signal quality thresholds comprise different RSRP thresholds.

In a sixth aspect, alone or in combination with one or more of the first through fifth aspects, process 600 includes receiving an indication of a condition that is associated with the plurality of energy values, wherein communicating with the network node is in response to the condition being satisfied.

In a seventh aspect, alone or in combination with one or more of the first through sixth aspects, the condition is for a conditional handover, wherein communicating with the network node comprises performing the conditional handover from another network node to the network node in response to the condition being satisfied.

In an eighth aspect, alone or in combination with one or more of the first through seventh aspects, receiving the signaling indicating the plurality of energy values comprises receiving the signaling from the other network node.

In a ninth aspect, alone or in combination with one or more of the first through eighth aspects, the condition is for a conditional LTM, wherein communicating with the network node comprises performing the conditional LTM from another network node to the network node in response to the condition being satisfied.

In a tenth aspect, alone or in combination with one or more of the first through ninth aspects, receiving the signaling indicating the plurality of energy values comprises receiving the signaling from the other network node.

In an eleventh aspect, alone or in combination with one or more of the first through tenth aspects, the condition is for a cell selection or reselection procedure, wherein communicating with the network node comprises performing the cell selection or reselection procedure with the network node in response to the condition being satisfied.

In a twelfth aspect, alone or in combination with one or more of the first through eleventh aspects, process 600 includes receiving one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the network node is further in response to a second condition that is associated with the plurality of second energy values not being satisfied.

In a thirteenth aspect, alone or in combination with one or more of the first through twelfth aspects, the condition is for reporting measurements associated with the plurality of configurations, wherein communicating with the network node comprises reporting measurements for one or more configurations of the plurality of configurations in response to the condition being satisfied for each of the one or more configurations.

In a fourteenth aspect, alone or in combination with one or more of the first through thirteenth aspects, the condition is for performing measurements associated with the plurality of configurations, wherein the process 600 includes performing measurements associated with one or more configurations of the plurality of configurations in response to the condition being satisfied for each of the one or more configurations.

In a fifteenth aspect, alone or in combination with one or more of the first through fourteenth aspects, the condition is satisfied based at least in part on the first energy value satisfying a threshold energy value associated with the condition.

In a sixteenth aspect, alone or in combination with one or more of the first through fifteenth aspects, the condition is further associated with one or more additional parameters.

In a seventeenth aspect, alone or in combination with one or more of the first through sixteenth aspects, the condition is satisfied based at least in part on a decision value satisfying a threshold, wherein the decision value is indicated by a mapping of the one or more additional parameters and the first energy value to the decision value.

In an eighteenth aspect, alone or in combination with one or more of the first through seventeenth aspects, the condition is satisfied based at least in part on a decision value satisfying a threshold, wherein the decision value is a function of the one or more additional parameters and the first energy value.

In a nineteenth aspect, alone or in combination with one or more of the first through eighteenth aspects, the one or more additional parameters comprise at least one of an SNR, an SINR, a RSRP, a QoS type, a beam identifier, a cell identifier, a time of day, or a position or zone identifier.

In a twentieth aspect, alone or in combination with one or more of the first through nineteenth aspects, receiving the signaling comprises receiving at least one of a multicast signal, a broadcast signal, or a signal that is dedicated to the UE.

In a twenty-first aspect, alone or in combination with one or more of the first through twentieth aspects, process 600 includes receiving, from the network node and via a MAC CE or a PDCCH, second signaling indicating an update to one or more of the plurality of energy values.

In a twenty-second aspect, alone or in combination with one or more of the first through twenty-first aspects, process 600 includes calculating, according to the plurality of energy values associated with the communications with the network node, an energy efficiency for communications with the network node, wherein communicating with the network node according to the first configuration is in response to calculating the energy efficiency for communications with the network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
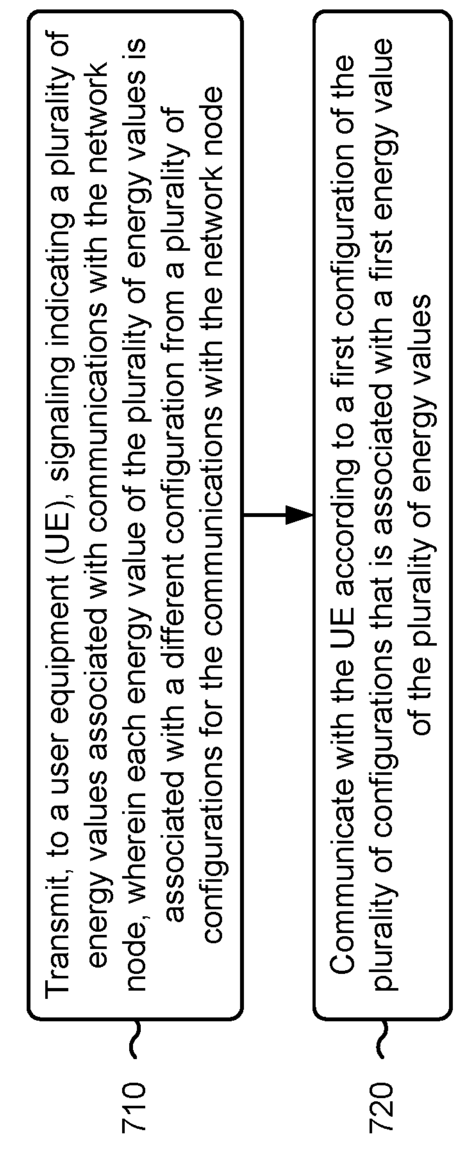
FIG. 7 is a diagram illustrating an example process performed, for example, at a network node or an apparatus of a network node, in accordance with the present disclosure.

FIG. 7 is a diagram illustrating an example process 700 performed, for example, at a network node or an apparatus of a network node, in accordance with the present disclosure. Example process 700 is an example where the apparatus or the network node (e.g., network node 110) performs operations associated with communications based on energy costs.

As shown in FIG. 7, in some aspects, process 700 may include transmitting, to a UE, signaling indicating a plurality of energy values associated with communications with the network node, wherein each energy value of the plurality of energy values is associated with a different configuration from a plurality of configurations for the communications with the network node (block 710). For example, the network node (e.g., using transmission component 904 and/or communication manager 906, depicted in FIG. 9) may transmit, to a UE, signaling indicating a plurality of energy values associated with communications with the network node, wherein each energy value of the plurality of energy values is associated with a different configuration from a plurality of configurations for the communications with the network node, as described above.

As further shown in FIG. 7, in some aspects, process 700 may include communicating with the UE according to a first configuration of the plurality of configurations that is associated with a first energy value of the plurality of energy values (block 720). For example, the network node (e.g., using reception component 902, transmission component 904, and/or communication manager 906, depicted in FIG. 9) may communicate with the UE according to a first configuration of the plurality of configurations that is associated with a first energy value of the plurality of energy values, as described above.

Process 700 may include additional aspects, such as any single aspect or any combination of aspects described below and/or in connection with one or more other processes described elsewhere herein.

In a first aspect, each energy value of the plurality of energy values indicates an energy cost at the network node corresponding to one of the plurality of configurations.

In a second aspect, alone or in combination with the first aspect, each configuration from the plurality of configurations comprises a serving beam configuration from a plurality of serving beam configurations, wherein each energy value of the plurality of energy values is associated with a different serving beam configuration from the plurality of serving beam configurations.

In a third aspect, alone or in combination with one or more of the first and second aspects, the plurality of serving beam configurations comprise different SSB indices or different groups of SSBs.

In a fourth aspect, alone or in combination with one or more of the first through third aspects, each configuration from the plurality of configurations is associated with a signal quality threshold from a plurality of signal quality thresholds, wherein each energy value of the plurality of energy values is associated with a different signal quality threshold from the plurality of signal quality thresholds.

In a fifth aspect, alone or in combination with one or more of the first through fourth aspects, the plurality of signal quality thresholds comprise different RSRP thresholds.

In a sixth aspect, alone or in combination with one or more of the first through fifth aspects, process 700 includes transmitting, to the UE, an indication of a condition that is associated with the plurality of energy values, wherein communicating with the UE is in response to the condition being satisfied.

In a seventh aspect, alone or in combination with one or more of the first through sixth aspects, the condition is for a conditional handover, wherein communicating with the UE comprises performing the conditional handover of the UE from another network node to the network node in response to the condition being satisfied.

In an eighth aspect, alone or in combination with one or more of the first through seventh aspects, the condition is for a conditional LTM, wherein communicating with the UE comprises performing the conditional LTM of the UE from another network node to the network node in response to the condition being satisfied.

In a ninth aspect, alone or in combination with one or more of the first through eighth aspects, the condition is for a cell selection or reselection procedure, wherein communicating with the UE comprises performing the cell selection or reselection procedure with the UE in response to the condition being satisfied.

In a tenth aspect, alone or in combination with one or more of the first through ninth aspects, process 700 includes transmitting one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the UE is further in response to a second condition that is associated with the plurality of second energy values not being satisfied.

In an eleventh aspect, alone or in combination with one or more of the first through tenth aspects, the condition is for reporting measurements associated with the plurality of configurations, wherein communicating with the UE comprises receiving measurement reports for one or more configurations of the plurality of configurations in response to the condition being satisfied for each of the one or more configurations.

In a twelfth aspect, alone or in combination with one or more of the first through eleventh aspects, the condition is associated with the UE performing measurements associated with the plurality of configurations, wherein the condition indicates for the UE to perform measurements associated with one or more configurations of the plurality of configurations in response to the condition being satisfied for each of the one or more configurations.

In a thirteenth aspect, alone or in combination with one or more of the first through twelfth aspects, the condition is satisfied based at least in part on the first energy value satisfying a threshold energy value associated with the condition.

In a fourteenth aspect, alone or in combination with one or more of the first through thirteenth aspects, the condition is further associated with one or more additional parameters.

In a fifteenth aspect, alone or in combination with one or more of the first through fourteenth aspects, the condition is satisfied based at least in part on a decision value satisfying a threshold, wherein the decision value is indicated by a mapping of the one or more additional parameters and the first energy value to the decision value.

In a sixteenth aspect, alone or in combination with one or more of the first through fifteenth aspects, the condition is satisfied based at least in part on a decision value satisfying a threshold, wherein the decision value is a function of the one or more additional parameters and the first energy value.

In a seventeenth aspect, alone or in combination with one or more of the first through sixteenth aspects, the one or more additional parameters comprise at least one of an SNR, an SINR, an RSRP, a QoS type, a beam identifier, a cell identifier, a time of day, or a position or zone identifier.

In an eighteenth aspect, alone or in combination with one or more of the first through seventeenth aspects, transmitting the signaling comprises transmitting at least one of a multicast signal, a broadcast signal, or a signal that is dedicated to the UE.

In a nineteenth aspect, alone or in combination with one or more of the first through eighteenth aspects, process 700 includes transmitting, to the UE via a MAC CE or a PDCCH, second signaling indicating an update to one or more of the plurality of energy values.

In a twentieth aspect, alone or in combination with one or more of the first through nineteenth aspects, process 700 includes receiving, from another network node, an indication of a plurality of second energy values associated with communications with the other network node, wherein each second energy value of the plurality of second energy values is associated with a different second configuration from a plurality of second configurations for the communications with the other network node, and transmitting, to the UE, second signaling indicating the plurality of second energy values.

In a twenty-first aspect, alone or in combination with one or more of the first through twentieth aspects, process 700 includes transmitting, to the UE, an indication of a condition that is associated with one or more second energy values of the plurality of second energy values, and determining whether to handover the UE from the network node to the other network node in response to whether the condition is satisfied.

In a twenty-second aspect, alone or in combination with one or more of the first through twenty-first aspects, process 700 includes performing, in response to the condition being satisfied and determining to handover from the network node to the other network node, a conditional handover or a conditional LTM to switch the UE from communicating with the network node to communicating with the other network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
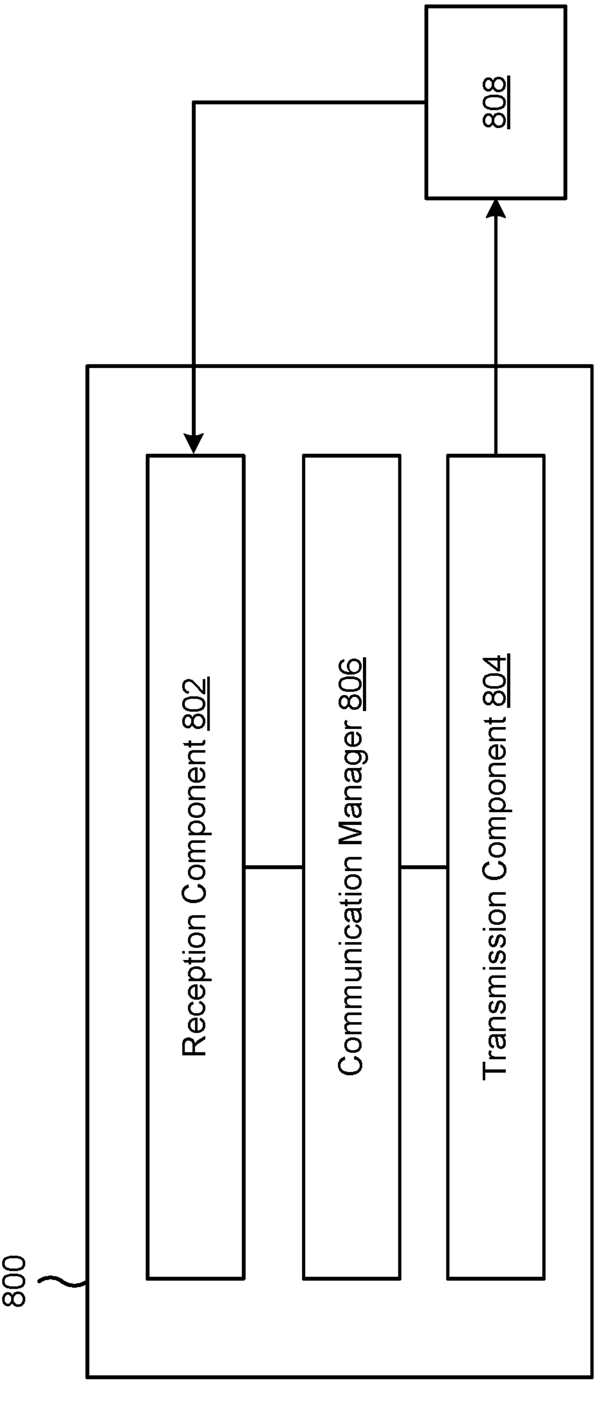
FIGS. 8 and 9 are diagrams of example apparatuses for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive signaling indicating a plurality of energy values associated with communications with a network node, wherein each energy value of the plurality of energy values is associated with a different configuration from a plurality of configurations for the communications with the network node. The reception component 802 and/or the transmission component 804 may communicate with the network node according to a first configuration of the plurality of configurations that is associated with a first energy value of the plurality of energy values.

The reception component 802 may receive an indication of a condition that is associated with the plurality of energy values, wherein communicating with the network node is in response to the condition being satisfied.

The reception component 802 may receive one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the network node is further in response to a second condition that is associated with the plurality of second energy values not being satisfied.

The reception component 802 may receive, from the network node and via a MAC CE or a PDCCH, second signaling indicating an update to one or more of the plurality of energy values.

The communication manager 806 may calculate, according to the plurality of energy values associated with the communications with the network node, an energy efficiency for communications with the network node, wherein communicating with the network node according to the first configuration is in response to calculating the energy efficiency for communications with the network node.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
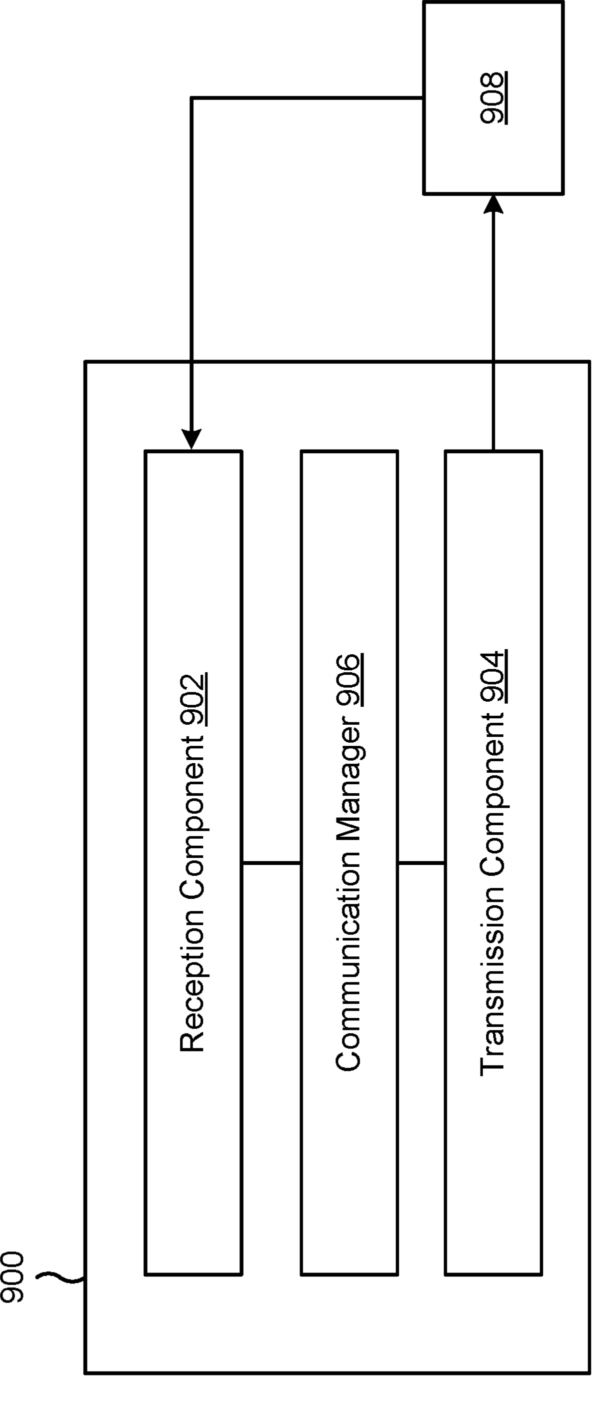

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit, to a UE, signaling indicating a plurality of energy values associated with communications with the network node, wherein each energy value of the plurality of energy values is associated with a different configuration from a plurality of configurations for the communications with the network node. The reception component 902 and/or the transmission component 904 may communicate with the UE according to a first configuration of the plurality of configurations that is associated with a first energy value of the plurality of energy values.

The transmission component 904 may transmit, to the UE, an indication of a condition that is associated with the plurality of energy values, wherein communicating with the UE is in response to the condition being satisfied.

The transmission component 904 may transmit one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the UE is further in response to a second condition that is associated with the plurality of second energy values not being satisfied.

The transmission component 904 may transmit, to the UE via a MAC CE or a PDCCH, second signaling indicating an update to one or more of the plurality of energy values.

The reception component 902 may receive, from another network node, an indication of a plurality of second energy values associated with communications with the other network node, wherein each second energy value of the plurality of second energy values is associated with a different second configuration from a plurality of second configurations for the communications with the other network node.

The transmission component 904 may transmit, to the UE, second signaling indicating the plurality of second energy values.

The transmission component 904 may transmit, to the UE, an indication of a condition that is associated with one or more second energy values of the plurality of second energy values.

The communication manager 906 may determine whether to handover the UE from the network node to the other network node in response to whether the condition is satisfied.

The communication manager 906 may perform, in response to the condition being satisfied and determining to handover from the network node to the other network node, a conditional handover or a conditional LTM to switch the UE from communicating with the network node to communicating with the other network node.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving signaling indicating a plurality of energy values associated with communications with a network node, wherein each energy value of the plurality of energy values is associated with a different configuration from a plurality of configurations for the communications with the network node; and communicating with the network node according to a first configuration of the plurality of configurations that is associated with a first energy value of the plurality of energy values.

Aspect 2: The method of Aspect 1, wherein each energy value of the plurality of energy values, indicates an energy cost at the network node corresponding to one of the plurality of configurations.

Aspect 3: The method of any of Aspects 1-2, wherein each configuration from the plurality of configurations comprises a serving beam configuration from a plurality of serving beam configurations, and wherein each energy value of the plurality of energy values is associated with a different serving beam configuration from the plurality of serving beam configurations.

Aspect 4: The method of Aspect 3, wherein the plurality of serving beam configurations comprise different SSB indices or different groups of SSBs.

Aspect 5: The method of any of Aspects 1-4, wherein each configuration from the plurality of configurations is associated with a signal quality threshold from a plurality of signal quality thresholds, and wherein each energy value of the plurality of energy values is associated with a different signal quality threshold from the plurality of signal quality thresholds.

Aspect 6: The method of Aspect 5, wherein the plurality of signal quality thresholds comprise different RSRP thresholds.

Aspect 7: The method of any of Aspects 1-6, further comprising: receiving an indication of a condition that is associated with the plurality of energy values, wherein communicating with the network node is in response to the condition being satisfied.

Aspect 8: The method of Aspect 7, wherein the condition is for a conditional handover, and wherein communicating with the network node comprises performing the conditional handover from another network node to the network node in response to the condition being satisfied.

Aspect 9: The method of Aspect 8, wherein receiving the signaling indicating the plurality of energy values comprises receiving the signaling from the other network node.

Aspect 10: The method of Aspect 7, wherein the condition is for a conditional LTM, and wherein communicating with the network node comprises performing the conditional LTM from another network node to the network node in response to the condition being satisfied.

Aspect 11: The method of Aspect 10, wherein receiving the signaling indicating the plurality of energy values comprises receiving the signaling from the other network node.

Aspect 12: The method of Aspect 7, wherein the condition is for a cell selection or reselection procedure, and wherein communicating with the network node comprises performing the cell selection or reselection procedure with the network node in response to the condition being satisfied.

Aspect 13: The method of Aspect 12, further comprising: receiving one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the network node is further in response to a second condition that is associated with the plurality of second energy values not being satisfied.

Aspect 14: The method of Aspect 7, wherein the condition is for reporting measurements associated with the plurality of configurations, and wherein communicating with the network node comprises reporting measurements for one or more configurations of the plurality of configurations in response to the condition being satisfied for each of the one or more configurations.

Aspect 15: The method of Aspect 7, wherein the condition is for performing measurements associated with the plurality of configurations, and wherein the method further comprises performing measurements associated with one or more configurations of the plurality of configurations in response to the condition being satisfied for each of the one or more configurations.

Aspect 16: The method of Aspect 7, wherein the condition is satisfied based at least in part on the first energy value satisfying a threshold energy value associated with the condition.

Aspect 17: The method of Aspect 7, wherein the condition is further associated with one or more additional parameters.

Aspect 18: The method of Aspect 17, wherein the condition is satisfied based at least in part on a decision value satisfying a threshold, and wherein the decision value is indicated by a mapping of the one or more additional parameters and the first energy value to the decision value.

Aspect 19: The method of Aspect 17, wherein the condition is satisfied based at least in part on a decision value satisfying a threshold, and wherein the decision value is a function of the one or more additional parameters and the first energy value.

Aspect 20: The method of Aspect 17, wherein the one or more additional parameters comprise at least one of an SNR, an SINR, an RSRP, a QoS type, a beam identifier, a cell identifier, a time of day, or a position or zone identifier.

Aspect 21: The method of any of Aspects 1-20, wherein receiving the signaling comprises receiving at least one of a multicast signal, a broadcast signal, or a signal that is dedicated to the UE.

Aspect 22: The method of any of Aspects 1-21, further comprising: receiving, from the network node and via a MAC CE or a PDCCH, second signaling indicating an update to one or more of the plurality of energy values.

Aspect 23: The method of any of Aspects 1-22, further comprising: calculating, according to the plurality of energy values associated with the communications with the network node, an energy efficiency for communications with the network node, wherein communicating with the network node according to the first configuration is in response to calculating the energy efficiency for communications with the network node.

Aspect 24: A method of wireless communication performed by a network node, comprising: transmitting, to a UE, signaling indicating a plurality of energy values associated with communications with the network node, wherein each energy value of the plurality of energy values is associated with a different configuration from a plurality of configurations for the communications with the network node; and communicating with the UE according to a first configuration of the plurality of configurations that is associated with a first energy value of the plurality of energy values.

Aspect 25: The method of Aspect 24, wherein each energy value of the plurality of energy values indicates an energy cost at the network node corresponding to one of the plurality of configurations.

Aspect 26: The method of any of Aspects 24-25, wherein each configuration from the plurality of configurations comprises a serving beam configuration from a plurality of serving beam configurations, and wherein each energy value of the plurality of energy values is associated with a different serving beam configuration from the plurality of serving beam configurations.

Aspect 27: The method of Aspect 26, wherein the plurality of serving beam configurations comprise different SSB indices or different groups of SSBs.

Aspect 28: The method of any of Aspects 24-27, wherein each configuration from the plurality of configurations is associated with a signal quality threshold from a plurality of signal quality thresholds, and wherein each energy value of the plurality of energy values is associated with a different signal quality threshold from the plurality of signal quality thresholds.

Aspect 29: The method of Aspect 28, wherein the plurality of signal quality thresholds comprise different RSRP thresholds.

Aspect 30: The method of any of Aspects 24-29, further comprising: transmitting, to the UE, an indication of a condition that is associated with the plurality of energy values, wherein communicating with the UE is in response to the condition being satisfied.

Aspect 31: The method of Aspect 30, wherein the condition is for a conditional handover, and wherein communicating with the UE comprises performing the conditional handover of the UE from another network node to the network node in response to the condition being satisfied.

Aspect 32: The method of Aspect 30, wherein the condition is for a conditional LTM, and wherein communicating with the UE comprises performing the conditional LTM of the UE from another network node to the network node in response to the condition being satisfied.

Aspect 33: The method of Aspect 30, wherein the condition is for a cell selection or reselection procedure, and wherein communicating with the UE comprises performing the cell selection or reselection procedure with the UE in response to the condition being satisfied.

Aspect 34: The method of Aspect 33, further comprising: transmitting one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the UE is further in response to a second condition that is associated with the plurality of second energy values not being satisfied.

Aspect 35: The method of Aspect 30, wherein the condition is for reporting measurements associated with the plurality of configurations, and wherein communicating with the UE comprises receiving measurement reports for one or more configurations of the plurality of configurations in response to the condition being satisfied for each of the one or more configurations.

Aspect 36: The method of Aspect 30, wherein the condition is associated with the UE performing measurements associated with the plurality of configurations, and wherein the condition indicates for the UE to perform measurements associated with one or more configurations of the plurality of configurations in response to the condition being satisfied for each of the one or more configurations.

Aspect 37: The method of Aspect 30, wherein the condition is satisfied based at least in part on the first energy value satisfying a threshold energy value associated with the condition.

Aspect 38: The method of Aspect 30, wherein the condition is further associated with one or more additional parameters.

Aspect 39: The method of Aspect 38, wherein the condition is satisfied based at least in part on a decision value satisfying a threshold, and wherein the decision value is indicated by a mapping of the one or more additional parameters and the first energy value to the decision value.

Aspect 40: The method of Aspect 38, wherein the condition is satisfied based at least in part on a decision value satisfying a threshold, and wherein the decision value is a function of the one or more additional parameters and the first energy value.

Aspect 41: The method of Aspect 38, wherein the one or more additional parameters comprise at least one of an SNR, an SINR, an RSRP, a QoS type, a beam identifier, a cell identifier, a time of day, or a position or zone identifier.

Aspect 42: The method of any of Aspects 24-41, wherein transmitting the signaling comprises transmitting at least one of a multicast signal, a broadcast signal, or a signal that is dedicated to the UE.

Aspect 43: The method of any of Aspects 24-42, further comprising: transmitting, to the UE via a MAC CE or a PDCCH, second signaling indicating an update to one or more of the plurality of energy values.

Aspect 44: The method of any of Aspects 24-43, further comprising: receiving, from another network node, an indication of a plurality of second energy values associated with communications with the other network node, wherein each second energy value of the plurality of second energy values is associated with a different second configuration from a plurality of second configurations for the communications with the other network node; and transmitting, to the UE, second signaling indicating the plurality of second energy values.

Aspect 45: The method of Aspect 44, further comprising: transmitting, to the UE, an indication of a condition that is associated with one or more second energy values of the plurality of second energy values; and determining whether to handover the UE from the network node to the other network node in response to whether the condition is satisfied.

Aspect 46: The method of Aspect 45, further comprising performing, in response to the condition being satisfied and determining to handover from the network node to the other network node, a conditional handover or a conditional LTM to switch the UE from communicating with the network node to communicating with the other network node.

Aspect 47: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-46.

Aspect 48: An apparatus for wireless communication at a device, the apparatus comprising one or more memories and one or more processors coupled to the one or more memories, the one or more processors individually or collectively configured to perform the method of one or more of Aspects 1-46.

Aspect 49: An apparatus for wireless communication, the apparatus comprising at least one means for performing the method of one or more of Aspects 1-46.

Aspect 50: A non-transitory computer-readable medium storing code for wireless communication, the code comprising instructions executable by one or more processors to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

Aspect 52: A device for wireless communication, the device comprising a processing system that includes one or more processors and one or more memories coupled with the one or more processors, the processing system configured to cause the device to perform the method of one or more of Aspects 1-46.

Aspect 53: An apparatus for wireless communication at a device, the apparatus comprising one or more memories and one or more processors coupled to the one or more memories, the one or more processors individually or collectively configured to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, coupled to the one or more memories, individually or collectively configured to:

receive signaling indicating a plurality of energy values associated with communications with a network node, wherein each energy value of the plurality of energy values is associated with a different configuration from a plurality of configurations for the communications with the network node;

receive an indication of a condition including one or more rules associated with how to use the plurality of energy values; and communicate, in response to the condition being satisfied, with the network node according to a first configuration of the plurality of configurations that is associated with a first energy value of the plurality of energy values.

2. The apparatus of claim 1, wherein each energy value of the plurality of energy values, indicates an energy cost at the network node corresponding to one of the plurality of configurations.

3. The apparatus of claim 1, wherein each configuration from the plurality of configurations comprises a serving beam configuration from a plurality of serving beam configurations, and wherein each energy value of the plurality of energy values is associated with a different serving beam configuration from the plurality of serving beam configurations.

4. The apparatus of claim 3, wherein the plurality of serving beam configurations comprise different synchronization signal block indices or different groups of synchronization signal blocks.

5. The apparatus of claim 1, wherein each configuration from the plurality of configurations is associated with a signal quality threshold from a plurality of signal quality thresholds, and wherein each energy value of the plurality of energy values is associated with a different signal quality threshold from the plurality of signal quality thresholds.

6. The apparatus of claim 5, wherein the plurality of signal quality thresholds comprise different reference signal received power thresholds.

7. The apparatus of claim 1, wherein the condition is for a conditional handover, and wherein communicating with the network node comprises performing the conditional handover from another network node to the network node in response to the condition being satisfied.

8. The apparatus of claim 7, wherein the one or more processors, to receive the signaling indicating the plurality of energy values, are configured to:

receive the signaling from the other network node.

9. The apparatus of claim 1, wherein the condition is for a conditional lower layer triggered mobility, and wherein communicating with the network node comprises performing the conditional lower layer triggered mobility from another network node to the network node in response to the condition being satisfied.

10. The apparatus of claim 9, wherein the one or more processors, to receive the signaling indicating the plurality of energy values, are configured to:

receive the signaling from the other network node.

11. The apparatus of claim 1, wherein the condition is for a cell selection or reselection procedure, and wherein communicating with the network node comprises performing the cell selection or reselection procedure with the network node in response to the condition being satisfied.

12. The apparatus of claim 11, wherein the one or more processors are further configured to:

receive one or more system information blocks comprising an indication of a plurality of second energy values associated with communications with another network node, wherein each second energy value of the plurality of second energy values is associated with a different second configuration from a plurality of second configurations for communications with the other network node, wherein performing the cell selection or reselection procedure with the network node is further in response to a second condition that is associated with the plurality of second energy values not being satisfied.

13. The apparatus of claim 1, wherein the condition is for reporting measurements associated with the plurality of configurations, and wherein communicating with the network node comprises reporting measurements for one or more configurations of the plurality of configurations in response to the condition being satisfied for each of the one or more configurations.

14. The apparatus of claim 1, wherein the condition is for performing measurements associated with the plurality of configurations, and wherein the one or more processors are further configured to:

perform measurements associated with one or more configurations of the plurality of configurations in response to the condition being satisfied for each of the one or more configurations.

15. The apparatus of claim 1, wherein the condition is satisfied based at least in part on the first energy value satisfying a threshold energy value associated with the condition.

16. The apparatus of claim 1, wherein the condition is further associated with one or more additional parameters.

17. The apparatus of claim 16, wherein the condition is satisfied based at least in part on a decision value satisfying a threshold, and wherein the decision value is indicated by a mapping of the one or more additional parameters and the first energy value to the decision value.

18. The apparatus of claim 16, wherein the condition is satisfied based at least in part on a decision value satisfying a threshold, and wherein the decision value is a function of the one or more additional parameters and the first energy value.

19. The apparatus of claim 16, wherein the one or more additional parameters comprise at least one of a signal to noise ratio, a signal to noise plus interference ratio, a reference signal received power, a quality of service type, a beam identifier, a cell identifier, a time of day, or a position or zone identifier.

20. The apparatus of claim 1, wherein the one or more processors, to receive the signaling, are configured to:

receive at least one of a multicast signal, a broadcast signal, or a signal that is dedicated to the UE.

21. The apparatus of claim 1, wherein the one or more processors are further configured to:

receive, from the network node and via a medium access control control element or a physical downlink control channel, second signaling indicating an update to one or more of the plurality of energy values.

22. The apparatus of claim 1, wherein the one or more processors are further configured to:

calculate, according to the plurality of energy values associated with the communications with the network node, an energy efficiency for communications with the network node, wherein communicating with the network node according to the first configuration is in response to calculating the energy efficiency for communications with the network node.

23. The apparatus of claim 1, wherein the plurality of energy values are associated with communicating with the UE independent of a specific type of UE.

24. An apparatus for wireless communication at a network node, comprising:

one or more memories; and one or more processors, coupled to the one or more memories, individually or collectively configured to:

transmit, to a user equipment (UE), signaling indicating a plurality of energy values associated with communications with the network node, wherein each energy value of the plurality of energy values is associated with a different configuration from a plurality of configurations for the communications with the network node;

transmit an indication of a condition including one or more rules associated with how to use the plurality of energy values; and communicate, in response to the condition being satisfied, with the UE according to a first configuration of the plurality of configurations that is associated with a first energy value of the plurality of energy values.

25. The apparatus of claim 24, wherein each energy value of the plurality of energy values indicates an energy cost at the network node corresponding to one of the plurality of configurations.

26. The apparatus of claim 24, wherein each configuration from the plurality of configurations comprises a serving beam configuration from a plurality of serving beam configurations, and wherein each energy value of the plurality of energy values is associated with a different serving beam configuration from the plurality of serving beam configurations.

27. The apparatus of claim 26, wherein the plurality of serving beam configurations comprise different synchronization signal block indices or different groups of synchronization signal blocks.

28. The apparatus of claim 24, wherein each configuration from the plurality of configurations is associated with a signal quality threshold from a plurality of signal quality thresholds, and wherein each energy value of the plurality of energy values is associated with a different signal quality threshold from the plurality of signal quality thresholds.

29. A method of wireless communication performed by a user equipment (UE), comprising:

receiving signaling indicating a plurality of energy values associated with communications with a network node, wherein each energy value of the plurality of energy values is associated with a different configuration from a plurality of configurations for the communications with the network node;

receiving an indication of a condition including one or more rules associated with how to use the plurality of energy values; and communicating, in response to the condition being satisfied, with the network node according to a first configuration of the plurality of configurations that is associated with a first energy value of the plurality of energy values.

30. A method of wireless communication performed by a network node, comprising:

transmitting, to a user equipment (UE), signaling indicating a plurality of energy values associated with communications with the network node, wherein each energy value of the plurality of energy values is associated with a different configuration from a plurality of configurations for the communications with the network node;

transmitting an indication of a condition including one or more rules associated with how to use the plurality of energy values; and communicating, in response to the condition being satisfied, with the UE according to a first configuration of the plurality of configurations that is associated with a first energy value of the plurality of energy values.

* * * * *